(12) United States Patent
Gruber

(10) Patent No.: US 7,390,153 B2
(45) Date of Patent: Jun. 24, 2008

(54) SHRINK-FIT CHUCK WITH ECCENTRIC POSITIONING

(75) Inventor: Jochen Gruber, Sigmaringen/Laiz (DE)

(73) Assignee: Guehring OHG, Albstadt (DE)

( * ) Notice: Subject to any disclaimer, the term of this patent is extended or adjusted under 35 U.S.C. 154(b) by 0 days.

(21) Appl. No.: 11/611,637

(22) Filed: Dec. 15, 2006

(65) Prior Publication Data

US 2007/0138168 A1    Jun. 21, 2007

(30) Foreign Application Priority Data

Dec. 16, 2005  (DE)  ............... 20 2005 019 707 U
Mar. 9, 2006   (DE)  ..................... 10 2006 011 007

(51) Int. Cl.
   *B23C 3/00*   (2006.01)
(52) U.S. Cl. ................................... 409/234
(58) Field of Classification Search ............ 409/231, 409/232, 233, 234; 408/239 A, 240, 238, 408/60; 279/102, 103, 158, 906; 175/425; 403/273; 29/447, 243; 219/635
See application file for complete search history.

(56) References Cited

U.S. PATENT DOCUMENTS

| | | | | |
|---|---|---|---|---|
| 5,280,671 A | * | 1/1994 | Marquart | 29/447 |
| 5,873,687 A | * | 2/1999 | Watanabe | 409/234 |
| 5,992,860 A | * | 11/1999 | Marquart | 279/102 |
| 6,339,868 B1 | * | 1/2002 | Nagaya et al. | 29/447 |
| 6,345,942 B1 | * | 2/2002 | Cook | 409/131 |
| 6,588,083 B2 | * | 7/2003 | Voss et al. | 29/447 |
| 7,186,064 B1 | * | 3/2007 | Erickson et al. | 409/234 |
| 2003/0118419 A1 | * | 6/2003 | Easterbrook et al. | 411/1 |
| 2006/0048615 A1 | * | 3/2006 | Treige | 82/158 |

FOREIGN PATENT DOCUMENTS

| | | |
|---|---|---|
| DE | 100 24 423 A1 | 11/2001 |
| DE | 101 21 743 A1 | 11/2002 |
| DE | 699 01 086 T2 | 11/2002 |
| DE | 101 38 107 A1 | 2/2003 |
| DE | 20 2005 006 567 U1 | 10/2005 |
| EP | 0 830 917 B1 | 3/1998 |

* cited by examiner

*Primary Examiner*—Dana Ross
(74) *Attorney, Agent, or Firm*—Oblon, Spivak, McClelland, Maier & Neustadt, P.C.

(57) ABSTRACT

A shrink-fit chuck tool holder for cylindrical, particularly circular cylindrical, shank tools, including a fastening shank for establishing connection to a machine tool and a thermally expandable shrink section. The shrink section has an inside recess for accommodation of a tool shank and a pre-positioning section, which precedes the recess via a step and has an axial extension. The pre-positioning section is disposed eccentrically to the inside recess.

9 Claims, 3 Drawing Sheets

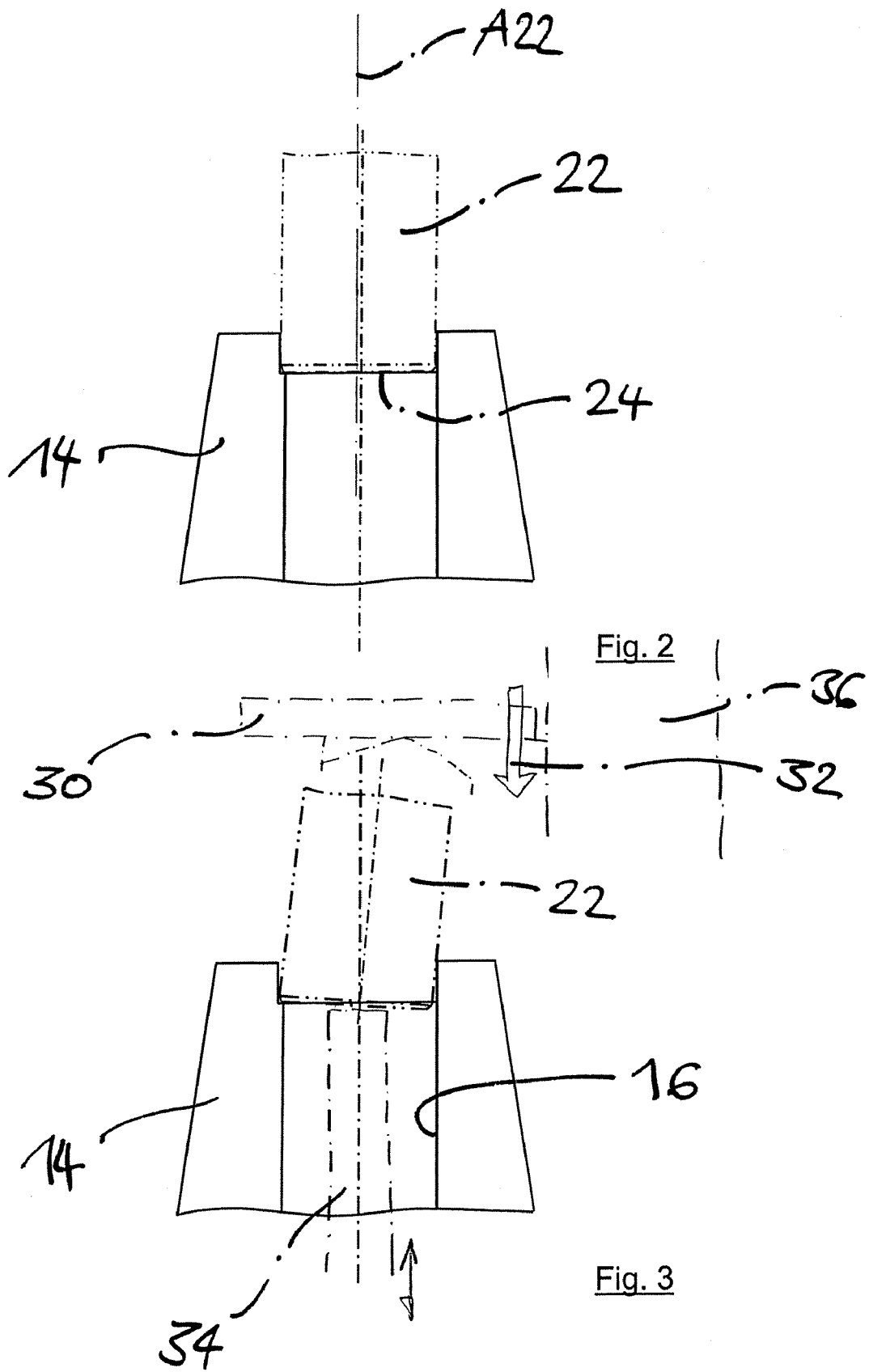

SHRINK-FIT CHUCK WITH ECCENTRIC POSITIONING

BACKGROUND OF THE INVENTION

1. Field of the Invention

The present invention relates to a chucking device for fastening a tool in a machine tool, particularly in the form of a shrink-fit chuck tool holder for cylindrical, particularly circular cylindrical tools, and to a chucking device for tensioning tools by the shrink-fit chuck.

2. Discussion of the Background

In metal machining operations, today primarily machine tools with high levels of automation are used in production. The chucking and gripping systems, into which the insert tools are clamped and which in turn are held in corresponding holders of the machine tool, for example standardized cylinder shank holders or hollow taper shank (HSK) jaws, significantly influence the quality of workpieces as well as the efficiency of the production processes.

Compared to conventional chucking devices, such as three-jaw chucks or extension chucks, shrink-fit chuck tool holders have greater rigidity in terms of the tool/tool holder unit and achieve greater transmittable torque. As a result, surface improvements on the workpiece, greater manufacturing precision and a longer service life of the tool can be achieved and production processes with extremely high rotational speeds and feed rates can be implemented, for example the so-called high-speed cutting (HSC).

Conventional devices available on the market for chucking insert tools in shrink-fit chucks are provided with a heating unit, for example using hot air or with the help of an induction coil, by which a tool holder is expanded so that the tool (which is still cold) can be inserted in the shank of the tool holder. After cooling and the associated shrinkage of the tool holder, the tool is tightly clamped in place. This way, low pairing tolerances for the pairing of the tool and tool holder and an accordingly tight fit of the tool are achieved.

Clamping devices in this category, particularly shrink-fit chucks, and chucking fixtures, which are also referred to as shrink fixtures, are described, for example, in the documents DE 101 38 107 A1 and EP 830917 B1.

To ensure clean positioning of the cold tool on the shrink-fit chuck, the tool shank is typically provided with a chamfer. To facilitate the insertion process, the recess of the shrink-fit chuck provided for accommodating the tool shank according to EP 830917 B1 has an insertion section, which allows pre-positioning of the tool shank in the cold state of the tool holder.

In this known case, the configuration is selected such that the insertion section holds the tool until the temperature of the shrink section or of the shrink-fit chuck is sufficiently high and the inside recess has expanded so much in terms of width or diameter that it has reached, or even exceeds, the outside dimension of the shank. When the tool and hence the shrink-fit chuck are oriented vertically in the shrink fixture, the tool glides into the shrink-fit chuck under the effects of gravity.

SUMMARY OF THE INVENTION

It has been determined, however, that this automatic, uncontrolled movement of the tool may be undesirable, for example when it is important to position the tool lip and hence the tool shank in very precise relation to the chuck, so that the automated use of the tool becomes simpler.

It is therefore the object of the invention to create a chucking device for fastening a tool in a machine tool, particularly in the form of a shrink-fit chuck tool holder for cylindrical tools, particularly circular cylindrical tools, which still guarantees easy handling of the tool prior to shrinking, but at the same time allows more control over the insertion process of the tool in the inside recess of the shrink-fit chuck. A further object is the creation of a shrink fixture, which allows improved handling during the shrinking process of the tool.

According to the invention, a shrink-fit chuck tool holder for cylindrical tools, particularly circular cylindrical shank tools, is created, comprising a fastening shank for the connection to a machine tool and a thermally expandable shrink section with an inside recess for a preferably centered accommodation of a tool shank and with a pre-positioning section, which precedes the recess via a step and has a small axial extension. The pre-positioning section is disposed eccentrically to the inside recess. This produces the advantage that the tool, preferably a circular cylindrical shank tool, can still be pre-positioned with ease. The tool is supported reliably on the step during the heating process of the shrink-fit chuck.

However, when the expansion of the inside recess has progressed sufficiently, the tool does not drop automatically and uncontrolled, but instead first inclines in a direction oriented away from the position of the greatest width of the step, resulting in slight tilting. In this state, the tool can be seized either manually or it can be moved into the inside recess in a controlled fashion using a manipulating device, such as a robot or a pressure plate with integrated measuring arm, until the tool has reached the predefined final position. This is associated with the further advantage that no large spaces remain in the insert of the tool in the region of the pre-positioning section even under difficult conditions, such as when machining casting materials, which spaces would be subject to contamination. At an axial length of several mm, this sickle-shaped space in its cross-section extends radially only in the range of several hundredths of a millimeter. Contamination-related problems are therefore eliminated when releasing and re-establishing the shrink connection. A particular advantage of the arrangement according to the invention is created particularly when tools with larger diameters, particularly solid carbide tools, are supposed to be inserted in the chuck. The weight of these tools is significant, so that until now, meaning with conventional shrink-fit chuck tool holders, an adjusting element was subjected to significant impact by the tool sliding down automatically under the effects of gravity. This disadvantageous effect is eliminated with the invention.

Particularly favorable conditions are created when the pre-positioning section and the inside recess are formed by circular cylindrical surfaces, respectively.

When the step is beveled with a chamfer, the pressing or insertion of the tool into the preheated inside recess becomes easier.

An advantageous shrink fixture for chucking tools in a shrink-fit chuck tool holder according to the invention includes a heating device for heating a substantially vertically oriented shrink-fit chuck with a pre-positioned tool and a handling device for the tool, which device can be positioned above the shrink-fit chuck, wherein the handling device, such as a stop plate and/or a centering aid optionally provided with a gripper device, interacts with the tool such that a tilting motion of the tool is permitted during the heating process of the shrink-fit chuck.

Advantageously, the shrink fixture additionally comprises a device for the dimensionally accurate axial displacement of the tool in the inside recess of the heated shrink-fit chuck. This device may be an adjusting device, which is described in the applicant's older and disclosed patent application DE 101 38

107 A1, the disclosure of which is hereby expressly included in the present application by reference.

BRIEF DESCRIPTION OF THE DRAWINGS

Exemplary embodiments of the invention will be explained in more detail hereinafter, wherein:

FIG. 2 is a schematic illustration of the face side of the cold shrink-fit chuck with a positioned tool;

FIG. 3 is an illustration corresponding to that according to FIG. 2 of the arrangement of shrink-fit chuck and tool when the shrink-fit chuck has been heated.

DESCRIPTION OF THE PREFERRED EMBODIMENTS

Figure 1:
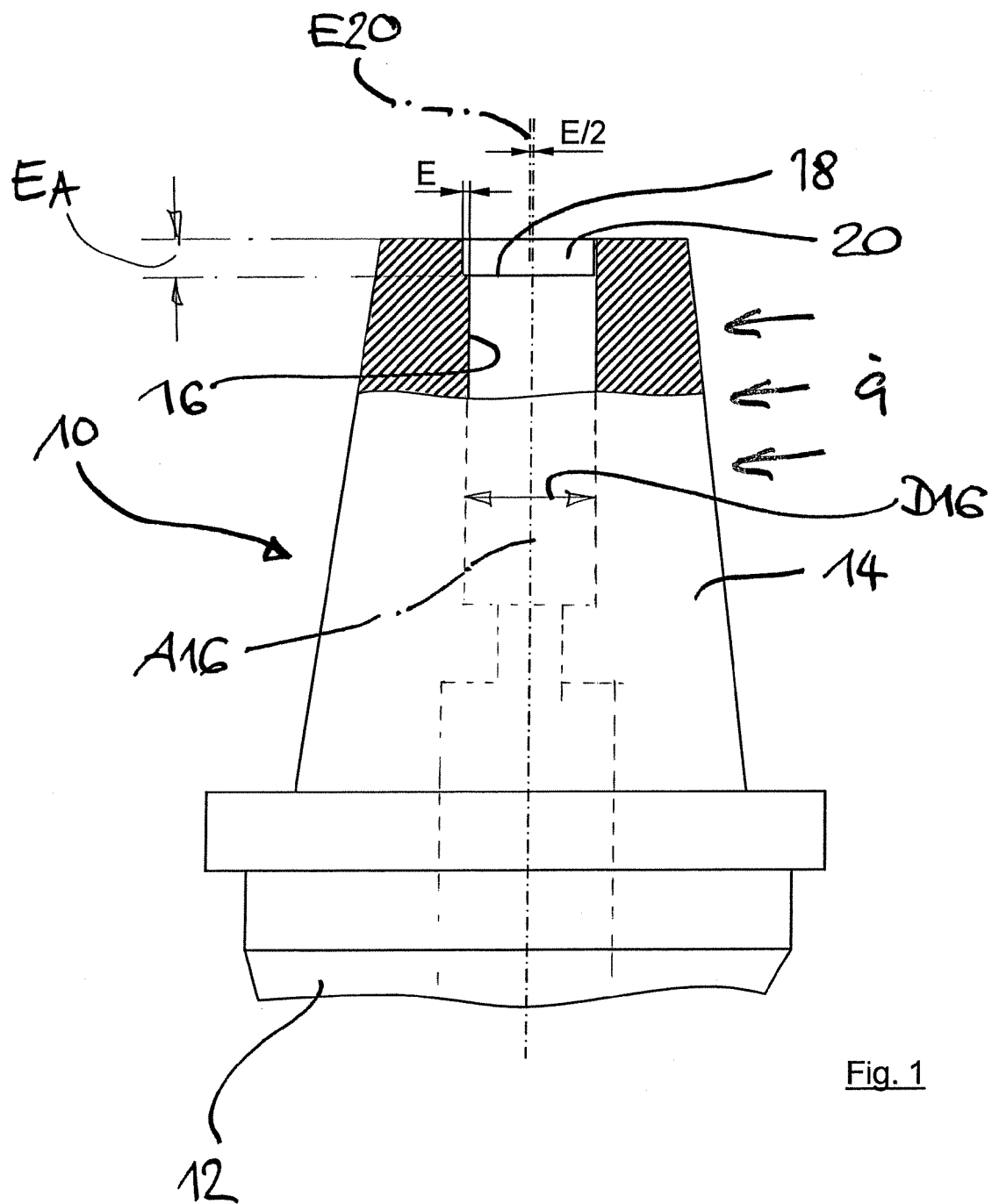
FIG. 1 is a schematic view of a shrink-fit chuck.

In FIG. 1, a shrink-fit chuck tool holder oriented vertically in a shrink fixture, which is not shown in detail, has been assigned reference numeral 10, which tool holder is intended for cylindrical tools, particularly circular cylindrical shank tools. The tool holder comprises a fastening shank 12, for example in the form of a hollow taper shank, which is not shown in detail and which is used to establish the connection to a machine tool. Reference numeral 14 designates a thermally expandable shrink section, comprising an inside recess 16 for the centered accommodation of a tool shank, which is not shown in detail, which recess is manufactured, preferably ground, to fit the outside diameter of the tool to be inserted. The inside recess 16 is formed by the circular cylindrical surface. The axis of the inside recess 16 has been assigned numeral A16.

The inside recess 16 has a diameter D16, which is adapted to the outside diameter of the tool such that shrink fit is guaranteed. The inside recess is preceded by a pre-positioning section 20 via a step 18, which section has a small axial dimension EA of several mm, for example.

The pre-positioning section 20 is likewise formed by a circular cylindrical surface, however it has an axis E20, which is offset parallel to the axis E16 by the eccentricity dimension E/2. The inside diameter D20 (see FIGS. 4 and 5) of the pre-positioning section 20 is slightly larger than the inside diameter D16 of the inside recess 16, specifically such that the cold tool can be inserted with clearance in the shrink-fit chuck 10, which is still cold.

This state is indicated in FIG. 2. The tool or the tool shank has been assigned numeral 22. It is disposed in the eccentric pre-positioning section 20, so that it rests on the step 18 with the face side 24, which is preferably chamfered. Due to the eccentricity of the surfaces 16 and 20, the step has a sickle shape (see FIG. 4), the largest width of which corresponds to double the eccentricity, meaning E. The axis A22 of the tool shank is offset in relation to the axis A16 of the inside recess 16 by the dimension E/2.

The eccentricity of course is illustrated excessively in the figures. For conventional tool shank diameters it has an order of magnitude of only several 1/100ths of a millimeter. Accordingly the width of the step 18 is small.

The step 18 may be additionally beveled with a chamfer, which is not shown in detail.

When an expansion of the shrink-fit chuck 14 occurs in the shrink fixture, the inside recess 16 and the pre-positioning section 20 expand. However, since the tool shank rests on the sickle-shaped step 18, the tool does not glide axially into the inside recess 16, but "tilts" away slightly laterally, as is shown schematically and exaggerated in FIG. 3, and specifically in a direction oriented away from the largest extension of the step (with the dimension E).

At this moment, a handling device 30 in the form of a measuring arm stop plate, which device may be positioned above the shrink-fit chuck 14 and is indicated in FIG. 3 with dash-dotted lines, for the tool 22 may become operable and press or move the tool 22 downward—as is indicated with the arrow 32—in a controlled fashion into the expanded inside recess 16, wherein support monitored by a measuring device by a drivable adjusting body 34 may be provided, as is described, for example, in the applicant's older and disclosed patent application DE 101 36 107 A1, the disclosure of which is hereby expressly included in the present application by reference.

Alternatively, the tool may also be manipulated solely manually. It has been shown, for example, that slight tapping of the tool and the heating of the shrink-fit chuck suffice to ensure that the tool glides into the bore 16.

It is also possible to provide a centering aid on a stand 36 of the shrink fixture, wherein in this case care must be taken that the slight lateral tilting motion is not impaired.

As a result, a shrink fixture is provided, comprising a device for the dimensionally accurate axial displacement of the tool 22 in the inside recess 16 of the heated shrink-fit chuck 14, wherein the components are handled gently, even if heavy tools, such as solid carbide tools with large diameters, need to be chucked.

Figure 4:
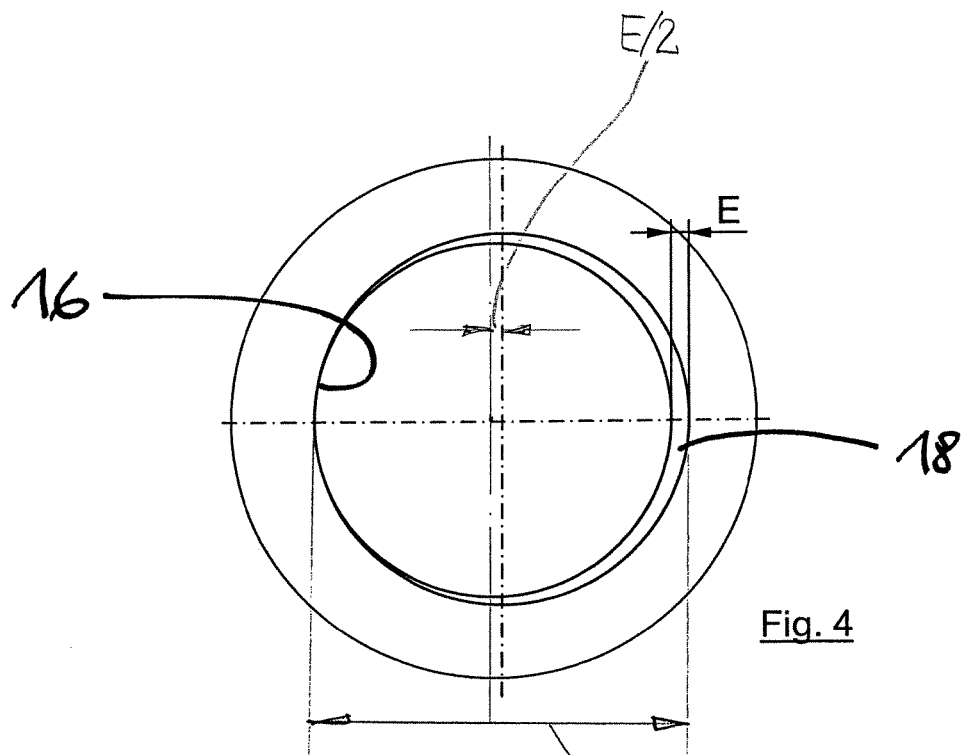
FIGS. 4 and 5 are front views of variations of the shrink-fit chuck.

FIG. 4 shows in an enlarged scale the front view of the shrink-fit chuck 10 according to FIGS. 1 to 3. The sickle-shaped step 18 is shown, which on the side facing away from the largest width E transitions smoothly into the inside surface of the inside recess 16. The illustration is not true to scale, but shows the sickle-shaped step in a grossly exaggerated image. The largest radial width of the sickle-shaped space, which remains between the inside wall of the recess 16 and the shank of the tool after inserting the tool in the shrink-fit chuck, is so small that the accumulation of dirt in this space can be excluded or easily controlled, resulting in high functional reliability with minimal maintenance.

Figure 5:
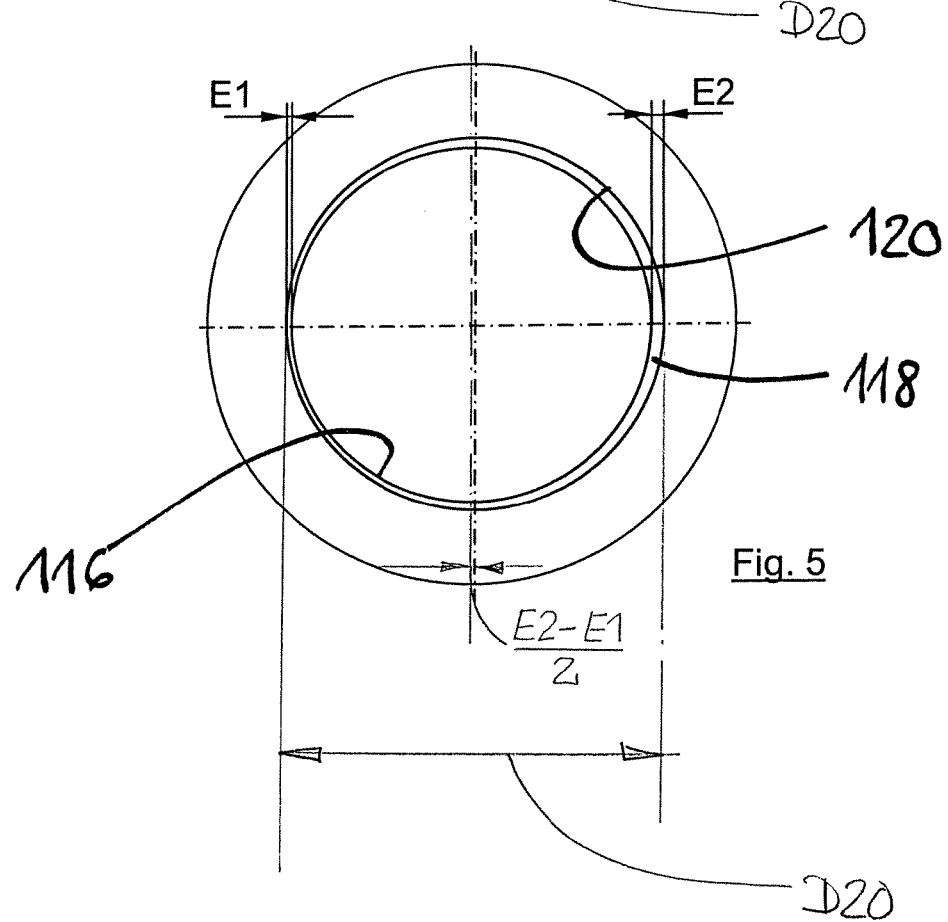

A variation is shown in FIG. 5. The eccentricity (E2−E1)/2 between the inside recess 116 of the shrink section and the pre-positioning section 120 in this case is smaller, resulting in a peripheral step 118, the width of which varies between the values E1 and E2.

The invention claimed is:

1. A shrink-fit chuck tool holder for cylindrical shank tools, comprising:
   a fastening shank establishing connection to a machine tool; and
   a thermally expandable shrink section,
   wherein the thermally expandable shrink section includes (1) an inside recess for accommodation of a tool shank and (2) a pre-positioning section that precedes the recess via a step and that has an axial extension,
   wherein the pre-positioning section is disposed eccentrically to the inside recess.

2. A shrink-fit chuck tool holder according to claim 1, wherein the pre-positioning section has a circular cylindrical surface.

3. A shrink-fit chuck tool holder according to claim 1, wherein the inside recess has a circular cylindrical surface.

4. A shrink-fit chuck tool holder according to claim 1, wherein the eccentricity corresponds substantially to half the difference between the inside diameters of the pre-positioning section and the inside recess.

5. A shrink-fit chuck tool holder according to claim 1, wherein the step is beveled with a chamfer.

6. A shrink-fit chuck tool holder according to claim 1, wherein the cylindrical shank tools are circular cylindrical.

7. A shrink fixture for chucking tools in a shrink-fit chuck tool holder including a fastening shank establishing connection to a machine tool, and a thermally expandable shrink section, wherein the thermally expandable shrink section includes (1) an inside recess for accommodation of a tool shank and (2) a pre-positioning section that precedes the recess via a step and that has an axial extension, wherein the pre-positioning section is disposed eccentrically to the inside recess, the shrink fixture comprising:

a heating device for heating the shrink-fit chuck tool holder oriented substantially vertically with a pre-positioned tool; and a handling device for the tool, wherein the handling device can be positioned above the shrink-fit chuck tool holder, and wherein the handling device interacts with the tool to allow a tilting motion of the tool during heating of the shrink-fit chuck tool holder.

8. A shrink fixture according to claim 7, wherein the holding device includes a device for dimensionally accurate axial displacement of the tool into the inside recess of the heated shrink-fit chuck.

9. A shrink fixture according to claim 7, wherein the cylindrical shank tools are circular cylindrical.

* * * * *